United States Patent [19]
Woo

[11] Patent Number: 5,796,204
[45] Date of Patent: Aug. 18, 1998

[54] BRUSHLESS MOTOR WITH A STATOR CORE INTEGRAL WITH A HOLDER

[75] Inventor: Suk Ha Woo, Kyungki-Do, Rep. of Korea

[73] Assignee: Samsung Electro-Mechanics Co., Ltd., Kyungki-do, Rep. of Korea

[21] Appl. No.: 581,797

[22] Filed: Jan. 2, 1996

[30] Foreign Application Priority Data

Dec. 30, 1994 [KR] Rep. of Korea ............... 1994 38308

[51] Int. Cl.$^6$ ............................................. H02K 1/12

[52] U.S. Cl. ................... 310/258; 310/91; 310/67 R; 310/217

[58] Field of Search .................... 310/67 R, 90, 310/91, 217, 156, 258; 360/99.08

[56] References Cited

U.S. PATENT DOCUMENTS

| | | | |
|---|---|---|---|
| 4,987,333 | 1/1991 | Noguchi et al. | 310/268 |
| 5,173,628 | 12/1992 | Yoshida et al. | 310/71 |
| 5,210,665 | 5/1993 | Nishizawa | 360/99.08 |

*Primary Examiner*—Steven L. Stephan
*Assistant Examiner*—Timothy A. Williams
*Attorney, Agent, or Firm*—Lowe Hauptman Gopstein & Berner

[57] ABSTRACT

A brushless motor with stator cores integrated with a holder, comprises a rotor consisting of a pulley mounted on a motor axis and a rotor case provided with a main magnet and an FG magnet on inner and outer peripheral faces of a lateral curved surface of the rotor case, and a stator wound with a driving coil and integrated with a holder for holding function, in which the stator is fixedly mounted on a PCB provided with a hole element and is structured to support the rotation of the motor axis.

9 Claims, 1 Drawing Sheet

5,796,204

BRUSHLESS MOTOR WITH A STATOR CORE INTEGRAL WITH A HOLDER

BACKGROUND OF THE INVENTION

1. Field of the Invention

This invention relates to a brushless motor, particularly to a motor axial system comprising a rotor and a stator in which the stator core is integrated with a holder and mounted to a motor axis so that a separate axial structure including a holder, etc. is unnecessary.

2. Description of the Prior Art

In general, a brushless motor is popularly called a commutatorless motor. In other words, such a motor is referred to as a direct current (DC) motor operating in an electronic manner without mechanical contact between the stator and brush which constitute construction elements of a motor.

DC motors are widely used for controlling velocity of rotation. DC motors have several advantages such as rapid acceleration, large driving torque, linear variation in rotation numbers caused by variation in applied voltage, and linearity of an output torque to an input current, etc. In addition, a variety of brushless motors are available with various functions according to their construction and use.

The following is the description of the prior art illustrating an example of a conventional brushless motor.

As shown in the FIG. 1, the brushless motor consists of a rotor and a stator. The rotor consists of a supporter 12 mounted on a motor axis 11, a pulley 13 pressed into the supporter 12, a rotor case 14 jointed with a lower portion of the supporter 12 and pulley 13, a main magnet 16 stuck to an inner peripheral face of a curved surface of the rotor case 14, and a Frequency Generator Magnet (FG magnet) 15 fixed in an outer peripheral face of the curved surface.

In addition, the stator consists of a bearing 17 and a holder 18 fixed to the motor axis 11, a stator core 19 and a PCB 22 coupled to the holder 18 by means of a screw 21. A driving coil 20 is wound to the stator core 19 and a Hall sensor 23 is provided to one side of the printed circuit board (PCB) 22. A washer 24 and a ring 25 are provided in a lower portion of the holder 18 so that the motor axis 11 is rotatable.

In the conventional brushless motor comprising a rotor and a stator, when a predetermined volume of current is applied to the brushless motor through the PCB 22, a magnetic field is induced in the driving coil 20 that is wound around the stator core 19, and then the rotor case 14 is rotated by an attractive and repulsive force produced between the magnetic field and the main magnet 16 according to Fleming's left hand rule.

At this stage, the FG magnet 15 fixed in the outer peripheral face of the curved surface of the rotor case 14 detects the rotating velocity of the motor by a sensing operation of the Hall sensor 23, and the rotating velocity is controlled by a motor driving circuit (not shown).

However, the conventional brushless motor described above requires a particular structure in which a separate holder is indispensable to fix and support the bearings and stator cores. Accurate assembly of the holder, particularly accuarate adjustment of the holder's position is difficult when mounting. Inaccurate mounting greatly affects the magnetic field of the motor, thereby critically diminishing the performance and efficiency of the motor.

SUMMARY OF THE INVENTION

In view of the foregoing problems, it is an object of this invention to provide a brushless motor having a stator core integrated with a holder to simplify the axial system of the motor as well as to allow easy manufacture and precise assembly of the motor by integrating the holder, which supports the motor axis, with a stator core and by jointing the integrated stator core with the motor axis by means of bearings.

To accomplish the object, a brushless motor according to an embodiment of this invention, comprises a rotor consisting of a pulley mounted on a motor axis, and a rotor case provided with a main magnet and an FG magnet on inner and outer peripheral faces of a lateral curved surface of the rotor case, respectively, and a stator wound with a driving coil and is integrated with a holder for holding function, in which the stator is fixedly mounted on a PCB provided with a Hall sensor and is structured to support the rotation of the motor axis.

BRIEF DESCRIPTION OF THE DRAWINGS

This invention will be more clearly understood from the description of the preferred embodiment as set forth below with reference to the accompanying drawings, wherein.

DETAILED DESCRIPTION OF THE PREFERRED EMBODIMENT

The preferred embodiment of the brushless motor according to this invention will be described hereinafter in detail with reference to FIG. 2.

Figure 1:
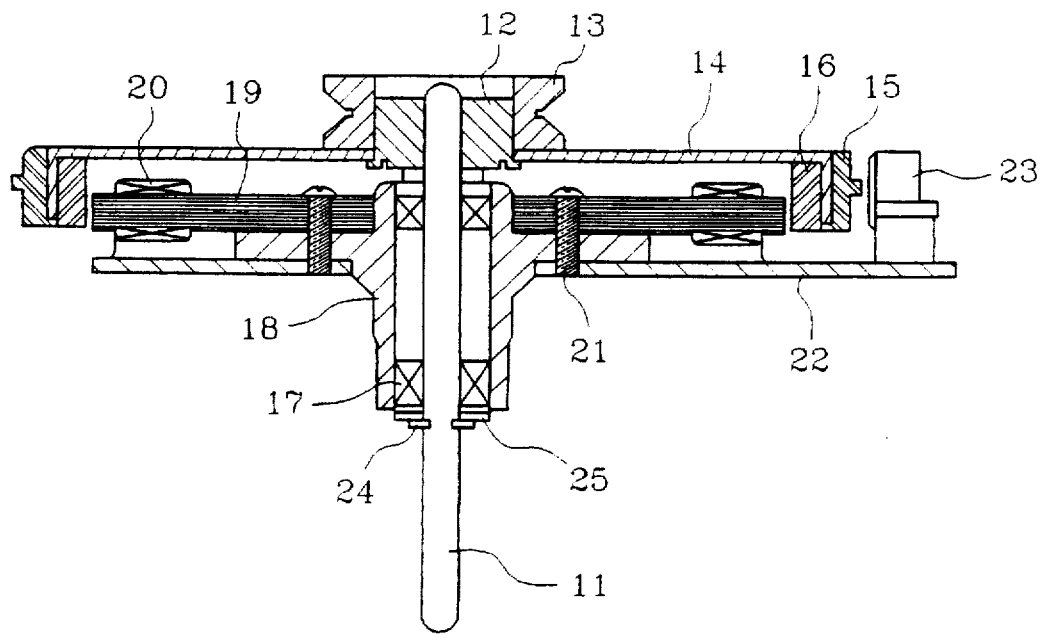
FIG. 1 shows a sectional view illustrating an example of a conventional brushless motor.
Figure 2:
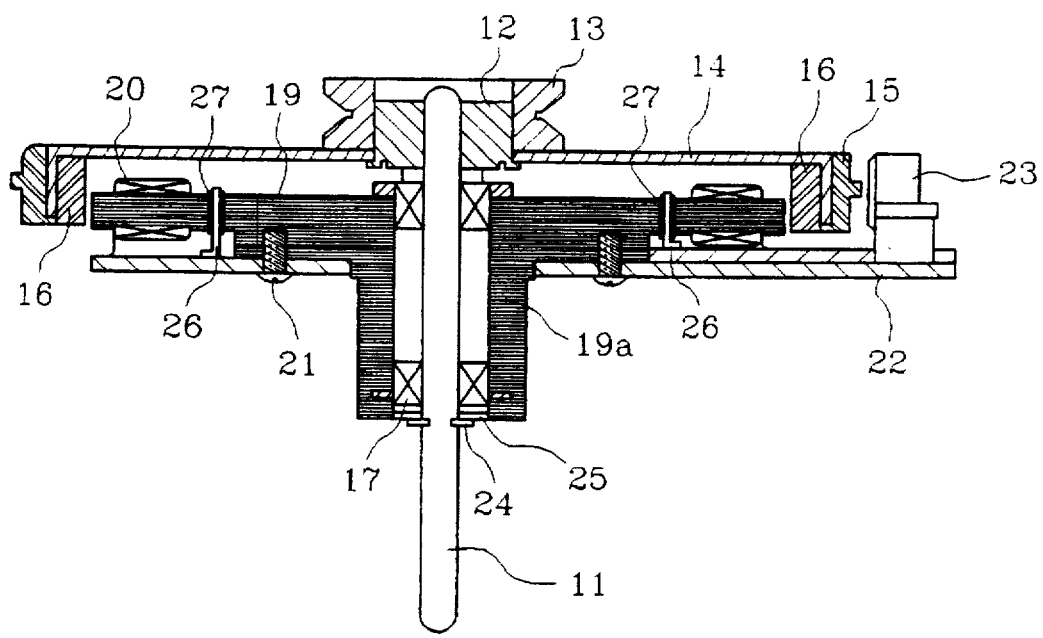
FIG. 2 shows a sectional view illustrating a brushless motor with a stator core integrated with a holder according to an embodiment of this invention.

Referring to FIG. 2, the brushless motor is basically composed of a rotor and a stator which are organically jointed with each other for interaction. The rotor is provided with a supporter 12 and a pulley 13 pressed into the supporter 12 on the upper portion of the motor axis 11 and a rotor case 14 under the pulley 13 with a main magnet 16 and an FG magnet 15 mounted on inner and outer peripheral faces of the curved portion of the rotor case 14, respectively. In addition, the stator is composed of a bearing 17 for smooth rotation of the motor axis 11 and a stator core 19 integrated with a holder 19a (first supporting member) for supporting the bearing 17.

A driving coil 20 is wound on the stator core 19 which is fixed by a screw 21 to a PCB 22 provided with a Hall sensor 23. A washer 24 and a ring 25 as supporting means are provided with the lower part of the motor axis 11 and the lower end of the holder 19a of the stator core 19. A supporting member 26 (second supporting member) insulated by a insulator 27 is provided with the outer peripheral face of the stator core 19 center.

In one embodiment of this invention, constructed as above, when a predetermined volume of current is applied through the PCB 22 of the brushless motor provided with the rotor and stator described above, a magnetic field is induced into the driving coil 20 wound around the stator core 19 of the stator. By the interaction between the magnet field and the main magnet 16 mounted on the inner peripheral face of the rotor case 14, attractive and repulsive forces are generated according to Fleming's left hand rule. The motor axis is rotated together with the rotor case 14 by these attractive and repulsive forces.

At this stage, the FG magnet 15 mounted on the outer peripheral face of the curved surface of the rotor case 14 detects the rotating velocity of the motor by a sensing operation of the hole element 23 provided with the PCB 22, and the rotating velocity is controlled by a motor driving circuit (not shown).

When driving the motor as described above, since the stator core 19 is configured to be integrated with the holder 19a, the holder integrated with the stator core 19 directly supports the bearing 17 adjacent to the motor axis 11, thereby a separate holder 18 indispensable in the prior art being no longer required.

Accordingly, the axial system of the motor can be simplified. Also, the integrated stator core 19 can be easily and firmly mounted and assembled on the PCB 22 by means of the tightening means (screw 21) and the supporting member 26 insulated by the insulator 27.

According to this invention described above, since the integrated stator core 19 can be mounted simply, easily, and precisely, the magnetic field can be smoothly induced when the motor is driven. This allows improvement of the motor's performance and efficiency. Further, the axial system of the motor can be simplified and the stator core can be manufactured with relative ease and precision, thereby greatly reducing manufacturing costs.

In addition, integration of the stator core 19 with the holder 19a allows an accurate adjustment of the horizontality and centrality of the magnetic field as well as of the verticality of the holder 19a, thereby preventing the motore axis 11 from being eccentric.

What is claimed is:

1. A brushless motor, comprising:

a motor shaft;

a rotor, including a supporter and a pulley located on the motor shaft, a rotor case having a main magnet mounted on an inner peripheral face of the rotor case, and a frequency generator magnet mounted on an outer peripheral face of the rotor case;

a stator, including a stator core, and at least one bearing supporting the motor shaft relative to the stator, and having at least one driving coil wound on said stator core;

a printed circuit board including a Hall sensor; and a first supporting member integrated with said stator core to support said bearing.

2. A brushless motor according to claim 1, wherein said stator core is structured for assembly and mounting on the printed circuit board by means of a plurality of screws and a plurality of second supporting members, said second supporting members insulated by a plurality of insulators.

3. A brushless motor according to claim 1, wherein the first supporting member and the stator core are of unitary construction.

4. A brushless motor according to claim 3, wherein the first supporting member and the stator core are made of the same material.

5. A brushless motor, comprising:

a motor shaft;

a rotor, including a supporter and a pulley located on the motor shaft, a rotor case having a main magnet mounted on an inner peripheral face of the rotor case, and a frequency generator magnet mounted on an outer peripheral face of the rotor case;

a stator, including a stator core, and at least one bearing supporting the motor shaft relative to the stator, and having at least one driving coil wound on said stator core;

a printed circuit board including a Hall sensor; and wherein said stator core is further formed with an axially extending holder being of integral and unitary construction with the stator core to support said bearing.

6. The brushless motor according to claim 1, wherein said first supporting member has an axially extending holder (19a) receiving the bearing and, at an upper end thereof, a larger diameter radially extending portion screwed to the printed circuit board with screws, said larger diameter radially extending portion being of smaller diameter than the stator core and of integral and unitary construction therewith.

7. The brushless motor according to claim 5, wherein said holder has an axially extending holder (19a) receiving the bearing and, at an upper end thereof, a larger diameter radially extending portion screwed to the printed circuit board with screws, said large diameter radially extending portion being of smaller diameter than the stator core and of integral and unitary construction therewith.

8. The brushless motor according to claim 6, wherein said screws extend only within said larger diameter radially extending portion.

9. The brushless motor of claim 7, wherein said screws extend only within said larger diameter radially extending portion.

* * * * *